(12) United States Patent
Lundsgaard et al.

(10) Patent No.: US 11,236,931 B2
(45) Date of Patent: Feb. 1, 2022

(54) ABSORPTION REFRIGERATION AND AIR CONDITIONING DEVICES

(71) Applicant: COOL4SEA APS, Svendborg (DK)

(72) Inventors: Hans Nicolai Schjerning Lundsgaard, Svendborg (DK); Daniel Buhl Hansen, Svendborg (DK); Mark Hollaender Viese, Odense SO (DK); Christian Fonnesbaek Jensen, Odense C (DK)

(73) Assignee: COOL4SEA APS, Svendborg (DK)

( * ) Notice: Subject to any disclaimer, the term of this patent is extended or adjusted under 35 U.S.C. 154(b) by 761 days.

(21) Appl. No.: 16/072,693

(22) PCT Filed: Jan. 19, 2017

(86) PCT No.: PCT/EP2017/051041
§ 371 (c)(1),
(2) Date: Jul. 25, 2018

(87) PCT Pub. No.: WO2017/129464
PCT Pub. Date: Aug. 3, 2017

(65) Prior Publication Data
US 2021/0207856 A1 Jul. 8, 2021

Related U.S. Application Data (60) Provisional application No. 62/288,115, filed on Jan. 28, 2016.

(51) Int. Cl.
*F25B 15/06* (2006.01)
*B63J 2/02* (2006.01)
(Continued)

(52) U.S. Cl.
CPC .............. *F25B 15/06* (2013.01); *B63J 2/02* (2013.01); *F25B 17/02* (2013.01); *F25B 35/02* (2013.01);
(Continued)

(58) Field of Classification Search
CPC ........ F25B 15/06; F25B 17/02; F25B 43/046; F25B 35/02; F25B 2339/024; F25B 2315/002; B63J 2/02
(Continued)

(56) References Cited

U.S. PATENT DOCUMENTS

| 1,085,624 A | 2/1914 | McKee et al. ................ 261/147 |
| 1,781,541 A | 11/1930 | Einstein et al. ................ 62/110 |

(Continued)

FOREIGN PATENT DOCUMENTS

| CN | 101451775 | 6/2009 |
| CN | 201787837 U | * 4/2011 |

(Continued)

OTHER PUBLICATIONS

International Search Report and Written Opinion in PCT/EP2017/051041 dated Aug. 2, 2017.
(Continued)

Primary Examiner — Steve S Tanenbaum
(74) Attorney, Agent, or Firm — Licata & Tyrrell P.C.

(57) ABSTRACT

An absorption refrigeration and air conditioning device capable of controlling temperature and/or the humidity of enclosed spaces particularly useful in maritime applications and improving fuel economy of internal combustion engines is provided.

15 Claims, 4 Drawing Sheets

(51) Int. Cl.
*F25B 17/02* (2006.01)
*F25B 35/02* (2006.01)
*F25B 43/04* (2006.01)

(52) U.S. Cl.
CPC ...... *F25B 43/046* (2013.01); *F25B 2315/002* (2013.01); *F25B 2339/024* (2013.01)

(58) Field of Classification Search
USPC .......................................................... 62/476
See application file for complete search history.

(56) References Cited

U.S. PATENT DOCUMENTS

| | | | |
|---|---|---|---|
| 2,426,069 A | 8/1947 | Thomas | 62/474 |
| 2,473,385 A | 6/1949 | Whitlow | 62/105 |
| 3,283,533 A | 11/1966 | Aronson | 62/494 |
| 3,491,545 A | 1/1970 | Leonard | 62/101 |
| 4,031,712 A | 6/1977 | Costello | 62/483 |
| 4,292,808 A | 10/1981 | Lohmiller | 60/673 |
| 4,345,440 A | 8/1982 | Allen et al. | 62/116 |
| 5,016,445 A | 5/1991 | Wehr | 62/101 |
| 5,060,487 A | 10/1991 | Murray | 62/475 |
| 5,373,709 A * | 12/1994 | Tongu | F25B 15/02 62/476 |
| 5,896,747 A | 4/1999 | Antohi | 62/101 |
| 5,934,090 A * | 8/1999 | Ozu | F25B 15/06 62/141 |
| 2011/0259039 A1 | 10/2011 | Ma et al. | 62/495 |
| 2014/0338331 A1 | 11/2014 | Jin et al. | 60/714 |

FOREIGN PATENT DOCUMENTS

| | | | |
|---|---|---|---|
| CN | 104964477 | 10/2015 | |
| EP | 1457746 | 9/2004 | |
| EP | 2484992 | 8/2012 | |
| EP | 2484992 A1 * | 8/2012 | ............. F25B 15/06 |
| JP | 1-244258 | 9/1989 | |
| JP | 5-280822 | 10/1993 | |
| JP | 2000-2472 | 1/2000 | |
| JP | 2000-30469 | 11/2000 | |
| JP | 2007-255860 | 10/2007 | |
| JP | 2007-327658 | 12/2007 | |
| JP | 2013-2790 | 1/2013 | |
| JP | 6055097 | 12/2016 | |

OTHER PUBLICATIONS

International Preliminary Report on Patentability in PCT/EP2017/051041 dated Jul. 31, 2018.

\* cited by examiner

ABSORPTION REFRIGERATION AND AIR CONDITIONING DEVICES

This patent application is the National Stage of International Application No. PCT/EP2017/051041 filed Jan. 19, 2017, which claims the benefit of priority from U.S. Provisional Application Ser. No. 62/288,115, filed Jan. 28, 2016, each of which are herein incorporated by reference in their entirety.

BACKGROUND

The climate on ships requires regulation, particularly in hot areas, as ambient temperature and humidity increase to potentially unacceptable levels in maritime transportation.

However, the maritime environment is demanding due to the heeling and cranking of a ship and the shocks accompanying the breaking of waves.

Conventional absorption refrigeration units, which operate on the principle of de-humidification by heating a humidified liquid lithium bromide medium, cannot be applied without being modified for use under dynamic maritime conditions. Operational problems arise in conventional absorption units due to the movement of the ship.

Piston compressors are conventionally operated in order to regulate the environment on board a ship. However, these are expensive due to high cost of fuel, coolant liquid, refrigerant fluid and maintenance. Further, excess heat from the engines is dispersed to the environment.

An absorption cooling process was invented by Carré in 1858 and further developed by von Platen and Munters into a 3 fluid configuration that relied on gravity to transport fluid in the device and did not need to use pumping devices for fluid transport.

Einstein and Szilard disclosed in 1927 a refrigeration device, also see U.S. Pat. No. 1,781,541. In this device, a refrigerant medium is contained in an evaporator together with an inert gas. The refrigerant evaporates and together with the inert gas is transported to a condenser where the evaporate returns to its liquid state at the reduced temperature in the condenser which supplied with coolant. In U.S. Pat. No. 1,781,541, the refrigerant is butane which is immiscible with the inert ammonia gas. The butane has a lower density than the ammonia solution and the two components separate by stratification. The liquid butane returns via a conduit to the evaporator. The dense ammonia solution flows by gravity from the condenser to the generator unit via a heat exchanger where the application of heat from an external source causes the ammonia to evaporate. The ammonia gas returns to the evaporator via a conduit whereby its presence reduces the partial pressure of the refrigerant butane thus causing the refrigerant to evaporate. In the generator, water containing little ammonia is heated by passing an elevated container from which it drains gravitationally to the condenser via a heat exchanger whereby heat is transferred to the cold concentrated liquid flowing from the condenser to the generator. The cooled stream of water with low ammonia content is further cooled by passing through the cold water jacket of the condenser so that when it emerges in the condenser it is in a condition that promotes the rapid absorption of ammonia gas.

The various elements of the construction are brought into hydraulic balance by adjusting the elevation of the evaporator relative to the generator so that flow is maintained from the evaporator.

Published U.S. Patent Application No. 20110259039 discloses a thermally driven heat pump for heating and cooling. This thermally driven heat pump includes a low temperature evaporator for evaporating cooling fluid to remove heat. A first heat exchanger located at an outlet of a converging/diverging chamber of a first ejector receives a flow of primary fluid vapor and cooling fluid vapor ejected from the first ejector for condensing a portion of the cooling fluid vapor. An absorber located in the first heat exchanger absorbs cooling fluid vapor into an absorbing fluid to reduce the pressure in the first heat exchanger. A second heat exchanger located at an outlet of a converging/diverging chamber of a second ejector receives primary fluid vapor and cooling fluid vapor ejected from the second ejector for condensing the cooling fluid vapor and the primary fluid vapor. A separator in communication with the second ejector, the low temperature evaporator and the primary fluid evaporator separates the primary fluid from the cooling fluid.

U.S. Pat. No. 5,016,445 disclosed an absorption apparatus, method for producing a refrigerant effect, and an absorbent-refrigerant solution. The absorption apparatus comprises a housing and an absorber contained within the housing for producing a strong refrigerant solution. A generator refrigerant reservoir is situated in the bottom of the housing for producing a rising refrigerant vapor. A condenser is situated in the top of the housing for condensing the refrigerant vapor into a refrigerant liquid. An evaporator is disposed underneath the condenser in the housing for receiving the refrigerant liquid from the condenser and vaporizing the same to create a refrigerant effect. The absorption apparatus additionally comprises a pump for pumping the strong refrigerant solution from the absorber to the generator refrigerant reservoir. A process is disclosed for producing a refrigerant effect within a housing comprising producing a strong refrigerant solution by an absorber contained within the housing, and also producing a rising refrigerant vapor from a generator refrigerant reservoir positioned within the housing. The process also comprises condensing the refrigerant vapor into a refrigerant liquid by a condenser situated within the housing; vaporizing the refrigerant liquid by an evaporator disposed within the housing to produce the refrigerant effect; and pumping the strong refrigerant solution to the generator refrigerant reservoir. Also disclosed are an absorbent-refrigerant solution containing a promoter which enhances the vapor absorbent properties of the absorbent-refrigerant and a process for manufacturing an absorption apparatus.

U.S. Pat. No. 4,345,440 discloses a refrigeration system employing an adiabatic expansion and an impulse generating means for the oscillatory compression and pumping of a working fluid. The impulse generating means is a venturi having a liquid inlet downstream of the throat with means for applying heat by a heat source, typically the waste heat of an automobile engine to the working fluid. The working fluid may be used to cool air through an evaporation in an automobile passenger compartment.

SUMMARY OF THE INVENTION

The invention relates to a vapor absorption refrigeration device operated on the principle of de-humidification by heating a humidified liquid lithium bromide medium. Once dried, the lithium bromide solution is then humidified by absorption of water vapor deriving from a space that is to be de-humidified. The process of absorption releases heat which is accompanied by heat transfer from the surroundings to the liquid medium so that the process may be used to control the temperature and humidity of an enclosed space. The absorption refrigeration unit is especially useful in maritime applications to control the temperature or the humidity of enclosed spaces on a vessel.

A nonlimiting aspect of the present invention thus relates to an absorption refrigeration and air conditioning device capable of controlling temperature and/or the humidity of enclosed spaces. The device is particularly useful in maritime applications.

Another nonlimiting aspect of the present invention relates to utilization of the cooling capacity via a heat exchanger in order to chill the intake air used in internal combustion engines, thereby significantly improving fuel economy.

The device of the present invention comprises an absorber unit, wherein water vapor deriving from an evaporator unit is absorbed in a concentrated solution of lithium bromide releasing heat; a generator or concentrator unit wherein a diluted solution of lithium bromide is concentrated by energy absorbing evaporation; a condenser unit wherein vapor from the generator unit is cooled to a liquid by a coolant supply; and an evaporator unit wherein the water deriving from the condenser unit is evaporated thereby extracting heat from the exterior source that is to be refrigerated.

In one nonlimiting embodiment, a U-tube is fitted between the absorber unit and the base of the generator unit to compensate for pressure differences arising in the process and to return concentrated lithium bromide solution to the absorber.

In one nonlimiting embodiment, the diluted lithium bromide solution is pumped into the bottom of the generator unit by means of the absorber-generator transfer pump via a heat exchanger.

In one nonlimiting embodiment, concentrated lithium bromide solution is transferred from the base of the generator unit to the internal heat-exchanger and is returned to the absorber unit via conduits to ensure that the lithium bromide concentrate from the generator unit is cooled below its boiling point at the pressure in the absorber unit. In this nonlimiting embodiment, heat recovered from cooling the concentrated lithium bromide is utilized to preheat the dilute lithium bromide being transferred to the generator unit thereby improving thermal efficiency.

In one nonlimiting embodiment, the generator unit comprises a central divisor plate which separates dilute lithium bromide from the concentrate.

In one nonlimiting embodiment, the device of the present invention comprises baffles or baffle trays in one or more units to minimize and/or stop fluid movement and to avoid accelerating rhythmic movement of the fluids over large volumes. In this embodiment, when baffle trays are incorporated in the generator unit, the device may further comprise an entry tube fitted to the lower plate in the disentrainment section and projected downward to ensure that the entry velocity of vapor into the disentrainment section is optimal for the efficient operation of the disentrainment section and to prevent massive transport of concentrated lithium bromide solution into the disentrainment section when the ship heaves or rolls excessively or when lithium bromide brine boils ebulliently.

In one nonlimiting embodiment, vapor space at the top of the generator unit is fitted with a demister or mist-eliminator supported on the bottom plate of the vapor space.

In one nonlimiting embodiment, the generator unit comprises a generator column and the top stages of the generator unit are rinsed by periodically regulating a small back-flow of highly diluted lithium bromide solution to the top of the generator column.

In one nonlimiting embodiment, the condenser unit of the device comprises a plate heat exchanger cooled from an exterior such as a supply of cooling water, circulated seawater or the low temperature coolant circulation on the ship and a pressure regulating u-tube which controls the difference in pressure between the pressure domains in the condenser unit and the evaporator unit.

In one nonlimiting embodiment, the evaporator unit comprises a heat exchanger part connected via a conduit to a buffer tank containing the condensate water deriving from the condenser unit that allows separation of liquid and vapor phases and minimizes the effect of wide variation in ambient operating temperature. In one embodiment, circulation of water is forced by means of a pump thereby hindering local formation of ice in the evaporator unit or buffer tank.

In one nonlimiting embodiment, an inclined conduit having a relative large diameter transfers vapor from the evaporator unit to the absorber unit. In one nonlimiting embodiment, the conduit is fitted with appropriate baffles to limit liquid entrainment by momentum transfer from the absorber unit back to the evaporator unit under turbulent maritime conditions. In one nonlimiting, a vapor valve is fitted in the conduit to prevent transfer of lithium bromide solution back to the evaporator unit and to prevent transport of water vapor to the absorber when the equipment is not in function.

In one nonlimiting embodiment, the absorber unit comprises a tall column fitted with stepped baffle plates for creating an optimally large absorption surface.

In one nonlimiting embodiment, the absorber unit comprises a falling film type column fitted with multiple plates which provide a large absorption surface and which allow cooling and a reliable and uniform rate of concentration of the lithium bromide solution.

In one nonlimiting embodiment, the absorber unit comprises an injector of the venturi type which ensures rapid intermixing of the recirculating stream of concentrated lithium bromide solution from the generator unit and the water vapor that flows from the evaporator unit.

DETAILED DESCRIPTION OF THE INVENTION

An absorption cooling unit, which utilizes waste heat from any suitable source can improve overall fuel economy thereby reducing undesirable gaseous emissions, saving on fuel and cooling liquid consumption and loss, and reducing maintenance costs. The absorption cooling unit disclosed herein accommodates the special conditions related to maritime operation. The designs are particularly directed at reducing gravitational and inertial effects detrimental to efficient operation in maritime environments, and to ensure the capability of operating optimally at any naturally occurring ambient temperature.

Nonlimiting examples of suitable sources of waste heat include, but are not limited to, waste heat from engine coolant, hot air from working areas or accommodations where superfluous heat energy is available, heat from boiler or engine rooms aboard a vessel, and exhaust gases from engines.

Vapor absorption devices are commonly used where an ample and inexpensive source of low-grade heat is available or where heat is derived from solar collectors or wind turbines. In most ships ample heat is available from the prime mover as waste heat. This heat source can be utilized in a vapor absorption device to optionally heat or cool areas of the ship as required.

The aim and purpose of the present invention is to provide a means of utilizing a low-grade heat source as an energy source for refrigeration or optionally area-heating. In the embodiments disclosed a design has the purpose of extracting heat from the area to be cooled, in particular living accommodations, air-conditioned areas, storage areas, etc. of a ship. The devices of the present invention are useful in methods for regulating climate on a ship as well as in methods for improving fuel economy of an internal combustion engine by cooling the intake air used in the internal combustion engine with these vapor absorption refrigeration devices.

Experience from operating a conventional absorption prototype device clearly shows that two undesirable effects influence the reliability and efficiency of the absorber unit. In this disclosure, particular steps have been specified which enable an absorber unit, based on lithium bromide solution, to be modified to operate reliably and efficiently at sea. The first effect that limits efficiency is caused by contamination of the water content of the evaporator domain. It is critical to prevent transfer of lithium bromide solution to the evaporator where undesirable contamination with lithium bromide severely affects the efficiency of the evaporation process. Another critical problem relates to the salting out and caking of concentrated lithium bromide in conduits resulting in blockages.

Figure 1:
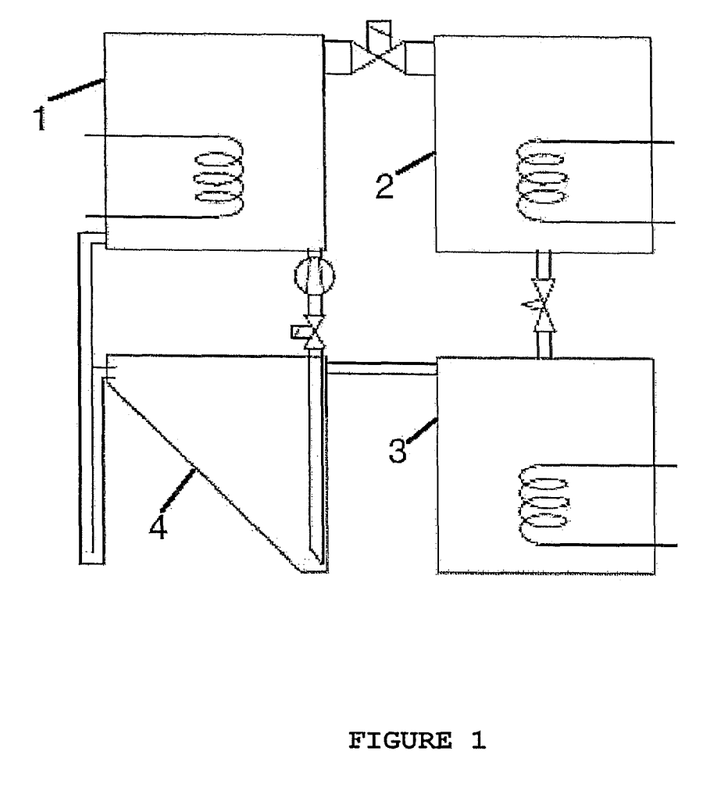
FIG. 1 provides a diagram of basic principles applied in design of an absorptive refrigeration unit of the present invention.

In simplest form, as depicted in FIG. 1, the device of the present invention comprises an absorber unit 4, wherein water vapor deriving from an evaporator unit 3 is absorbed in a concentrated solution of lithium bromide releasing heat; a generator or concentrator unit 1 wherein a diluted solution of lithium bromide is concentrated by energy absorbing evaporation; a condenser unit 2 wherein vapor from the generator unit 1 is cooled to a liquid by a coolant supply; and the evaporator unit 3 wherein the water deriving from the condenser unit 2 is evaporated thereby extracting heat from the exterior source that is to be refrigerated. A U-tube is fitted between the absorber unit 4 and the generator unit 1 to compensate for pressure differences arising in the process and to return concentrated lithium bromide solution to the absorber.

Figure 2:
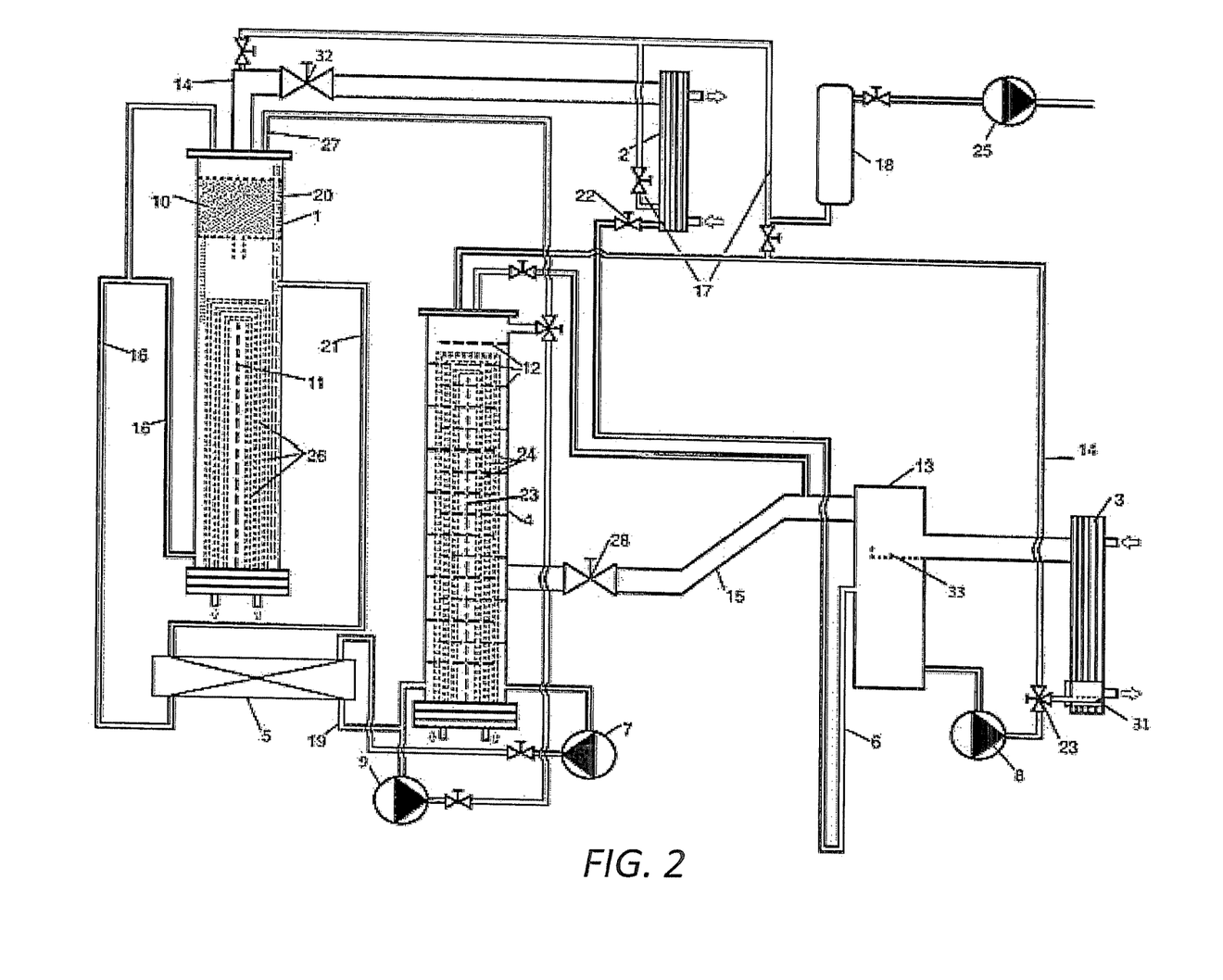
FIG. 2 shows a more detailed diagram of the principles of operation of an absorptive refrigeration unit of the present invention.

The principle of operation of a device of the present invention is shown in more detail in FIG. 2.

The function of the generator or concentrator unit 1 is to evaporate water from a dilute lithium bromide solution and thus concentrate it by utilizing heat from a low grade external source, such as engine coolant, supplied to the internal heat exchanger in the generator unit 1. The process rate is dependent both on the enthalpy change to evaporate water, compensating for the latent heat of vaporization, as well as the enthalpy used to concentrate the lithium bromide solution in view of the enthalpy change determined by the heat of salvation. See Palacios-Bereche et al. International Journal of Energy Research (2010) Published online in Wiley Online Library (wileyonlinelibrary.com). DOI: 10.1002/er.1790.

Figure 5:
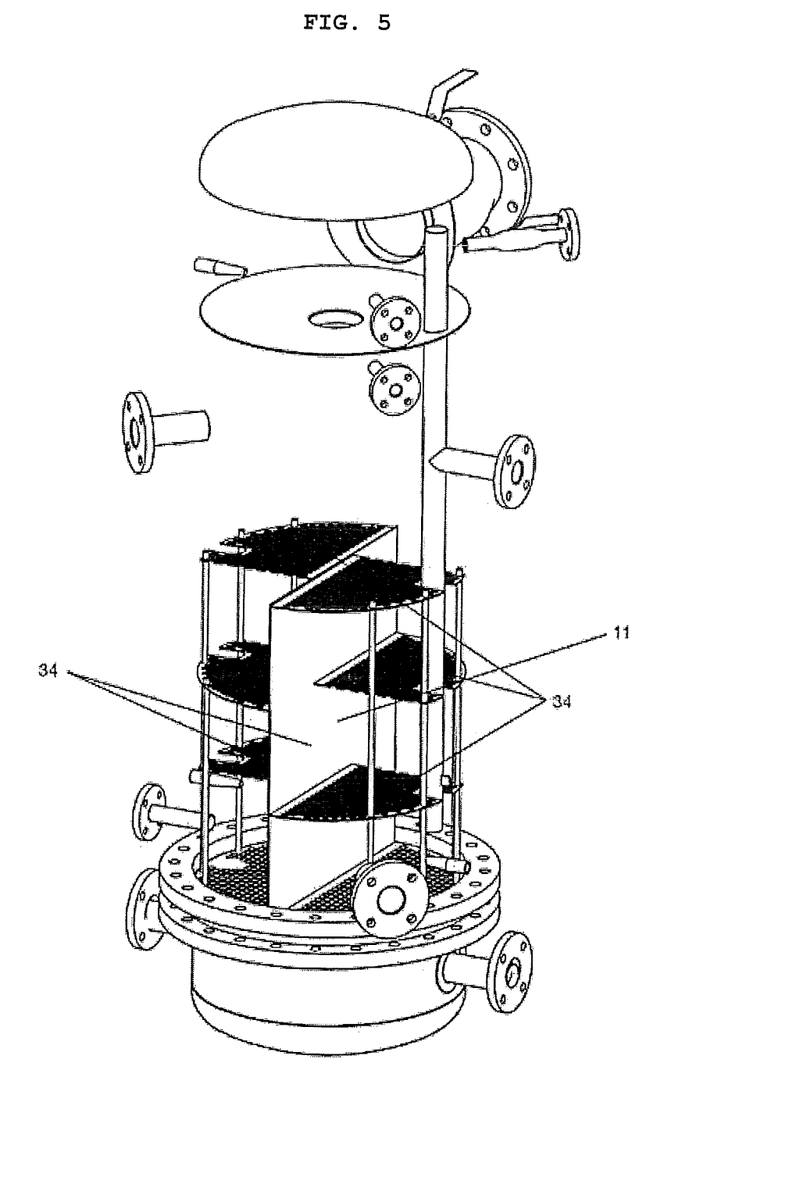
FIG. 5 provides a more detailed drawing of a generator inclusive of stepped baffle plates.

A conduit 21 acting as a U-tube determines the desired head of liquid in the generator unit 1 and leads concentrated lithium bromide away from the generator at the base of the generator unit 1. The conduit 21 ensures flow stability to the generator unit independently of the dynamic movement and degree of cranking or tilt of the vessel. The conduit is vented above the liquid vapor interface at the top of the generator unit. The flow of lithium bromide solution to the generator unit via conduit at the base of the generator unit instead of simply at the top, in the manner shown, prevents any undesirable transport by vapor entrainment or fluid momentum to the condenser unit from the generator unit. Low concentration LiBr solution is fed remotely at the opposite side of the generator to the input of heat. The nonlimiting embodiment of construction with a central separator plate and horizontally stepped baffle plate or plurality of plates 34 as depicted in FIG. 5 ensures an extended path of counterflow. Concentrated LiBr is more dense and collects at the bottom of the generator. The heat necessary for the evaporation process enters at a region of high LiBr concentration. In this counter current mode the rate of heating falls towards the regions of low LiBr concentration.

In order to limit the effects of gravitation and of momentum transfer which affects the degree of entrainment of lithium bromide and liquid transport from the generator unit, the diluted lithium bromide solution is pumped into the bottom of the generator unit by means of the absorbergenerator transfer pump 7 via a heat exchanger 5.

Concentrated lithium bromide solution is likewise transferred from the base of the generator unit 1 to the heat exchanger 5 and is returned to the absorber unit 4 via conduit 19. This heat exchanger ensures that the lithium bromide concentrate from the generator unit is cooled below its boiling point at the pressure in the absorber unit. Heat recovered from cooling the concentrated lithium bromide is utilized to preheat the dilute lithium bromide being transferred to the generator unit and thus improves thermal efficiency.

In order to ensure steady evaporation of water and avoid ebullient evaporation and resulting increase of solute entrainment, a central divisor plate 11 separates the dilute lithium bromide from the concentrate. The central divisor plate ensures that counter current conditions are maintained between an internal heat-exchanger and the lithium bromide solution that is being concentrated. In one embodiment, the internal heat-exchanger is a multi-tube heat exchanger 26. The heat-exchanger heats the generator unit via a low-grade heat source which may otherwise be wasted, such as coolant from ships driving motors. The generator unit has a chamber which is nominally maintained at a temperature of 83° and a pressure of 63 millibar (mbar). The fluid transport of approximately 2 liters a minute is maintained by means of the absorber-generator transfer pump 7.

In one nonlimiting embodiment, entrainment of lithium bromide concentrate in the vapor exhaust as well as the prevention of entrainment of fluid by dynamic movement of the vessel is controlled by fitting the generator unit with a horizontal baffle tray or stepped baffle plates 34 (see FIG. 5). In one nonlimiting embodiment, the trays support a 10 cm layer of 5 mm Raschig rings. The lower tray comprises a central pipe through which vapor is vented to the subsequent condensation stage. This lower tray has a single central vent pipe, dimensions of which are based on a need to have a vapor velocity of approximately 20 to 30 meters/second. The velocity of vapor in the tube was determined to be 23 meters per second which is an optimal value for efficient disentrainment and to limit re-entrainment. This embodiment also comprises a vapor valve 28 fitted to the lower plate in the disentrainment section that ensures that the entry velocity of vapor into the disentrainment section 10 is optimal for the efficient operation of the disentrainment section. The tube projection downwards towards the vapor liquid interface is intended to prevent massive transport of concentrated lithium bromide solution into the disentrainment section when the ship heaves or rolls excessively.

In one nonlimiting embodiment, the vapor space at the top of the generator unit is fitted with a demister or mist-eliminator supported on the bottom plate of the vapor space. Such mist eliminators of the wire-mesh type are manufactured by a number of global manufacturers such as, but not limited to, AMACS of Houston Tex., USA. It was found that coalesced liquid from the vapor filter section of the generator could easily drain back to the liquid in the generator. Re-entrained lithium bromide concentrate entering the conduit 14 was reduced by a factor of $10^3$.

In one nonlimiting embodiment, provisions are made for rinsing the top stages of the generator unit by periodically regulating via a valve a small back-flow of highly diluted lithium bromide solution to the top of the generator column.

The condenser unit 2 of the device comprises a plate heat exchanger cooled from an exterior such as a supply of cooling water, circulated sea-water or the low temperature coolant circulation on the ship, and maintained at a nominal temperature of 37° C. and a pressure of approximately 63 mbar.

A pressure regulating u-tube 6 controls the difference in pressure between the two pressure domains in the system. The u-tube ensures flow of water condensate from the condenser unit 2 to the evaporator unit 3. The elevation difference in the two limbs of the pressure regulating u-tube 6 determines the pressure difference in the evaporator-absorber domain compared to the generator-condenser domain. The generator unit operates at 83° C. and a pressure of approximately 63 mbar while the evaporator unit is maintained at 5° C. at a pressure of 8 mbar. These operating conditions are determined by the thermodynamic relationships for lithium bromide solutions. See Palacios-Bereche et al. International Journal of Energy Research (2010) Published online in Wiley Online Library (wileyonlinelibrary.com). DOI: 10.1002/er.1790.

The evaporator unit 3 and 13 of the device is the unit that extracts heat from the areas that are to be refrigerated. Heat is transported to the evaporator unit from areas in a ship that need cooling by conventional means. The evaporator unit comprises a heat exchanger 3 and a buffer tank 13 that allows separation of liquid and vapor phases. Heat is transported from the areas to be cooled to the evaporator unit. The buffer tank 13 contains the condensate water deriving from the condenser unit 2. The provision of a buffer tank 13 minimizes the effect of wide variation in ambient operating temperature. The forced recirculation of water by means of a pump 8 hinders local formation of ice in the evaporator unit or buffer tank and makes heat transfer more efficient. Further, the pump maintains reliable heat transfer at all conditions of heeling angle and dynamic movement of the vessel.

A liquid-vapor interface forms in the buffer tank which operates at reduced pressure, nominally 8 mbar, and a temperature of 5° C. The cooled water from the condenser unit 2 is transferred to the buffer tank 13 and the heat exchanger 3 of the evaporator unit by means of a circulation pump 8. The circulation pump 8 ensures a steady circulation and improves the efficiency of the evaporation unit. Forced circulation of the contents of the evaporator unit limits the effects of turbulence by momentum transfer under maritime conditions. The pump also serves as a draining pump when, during shut-down, the contents of the buffer tank 13 are transferred to the absorber unit 4. The resulting dilute solution of lithium bromide has a depressed freezing point and thus offers protection against frost.

Vapor from the evaporator unit 3 is transferred to the absorber unit 4 via an inclined conduit 15. The inclined conduit 15 has a relatively large diameter providing nominally from 15 to 25% of the sectional area of the absorber which promotes vapor transport from the evaporator unit with little drop in pressure. In one nonlimiting embodiment, the conduit is fitted with stepped baffles to limit liquid entrainment by momentum transfer from absorber unit back to the evaporator unit under turbulent maritime conditions.

A vapor valve 28 is fitted in this conduit 15, which is closed when the evaporator unit is not operating, in order to prevent transfer of lithium bromide solution back to the evaporator unit where undesirable contamination with lithium bromide severely affects the efficiency of the evaporation process.

Figure 3:
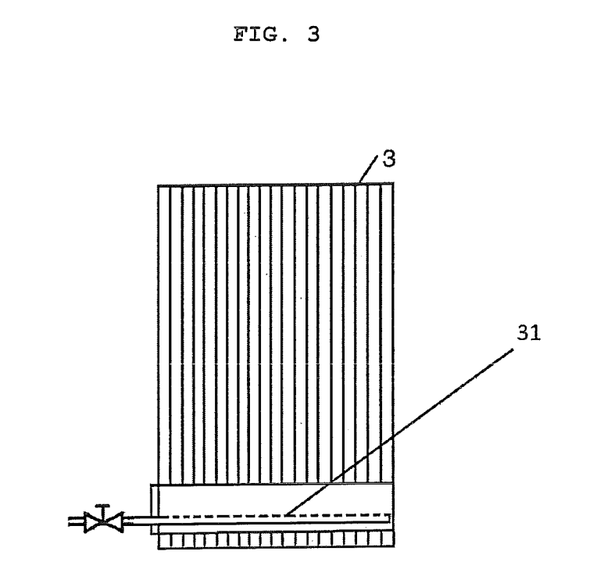
FIG. 3 provides a more detailed drawing of a nonlimiting embodiment of an evaporator unit, and in particular the heat exchanger, with a perforated feed tube at its bottom.
Figure 4:
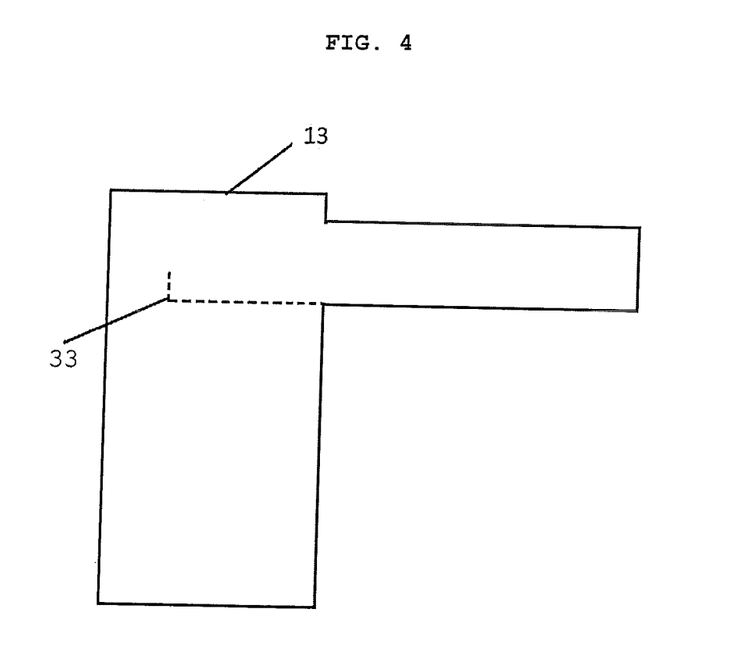
FIG. 4 provides a drawing of a nonlimiting embodiment of the evaporator unit, and in particular the buffer tank with a perforate feed tube near the top.

In one nonlimiting embodiment, a perforated feed tube 33 or tray 31 is fitted into the evaporator unit 3 or its buffer tank 13. In one nonlimiting embodiment, the perforated tube 31 is at the bottom of the evaporator. See FIG. 3. Alternatively, the perforated tray 33 may be placed closer to the top. See FIG. 4. The perforated feed tube 33 or tray 31 causes the liquid flow to the buffer tank to be divided in droplets. This presents an increased exposed liquid surface and enhanced evaporation in the buffer tank 13 so that the cooling process is more efficient.

In an alternative nonlimiting embodiment, multiple baffle plates are used in a stepping arrangement in order to increase the rate of evaporation and increase thermal efficiency. The absorber unit 4, when fitted with baffles as shown, is efficient at all angles of healing of the ship.

The device of the present invention further comprises an absorber unit 4. Water vapor from the buffer tank 13 is transported to the absorber unit 4 which comprises a tall column fitted with stepped baffle plates for creating an optimally large absorption surface. The design is efficient when the ship rolls so that the unit efficiency is maintained under all maritime operating conditions. The chamber of the absorber unit is cooled by an internal tube heat exchange process and is maintained at a temperature of 37° C. and 8 mbar pressure. Water vapor is absorbed in the concentrated lithium bromide that is fed from the generator unit via conduit 21 to the heat exchanger 5 and via conduit 19 to the absorber unit 4. Heat is released in the absorber unit by the change in enthalpy of solution as the lithium bromide solution is diluted and this heat is transported away by means of the internal tube heat 24. Circulation from the absorber unit to the generator unit and in the heat exchanger 5 is maintained by a pump 7 from which the cooled diluted lithium bromide from the absorber unit is fed to the generator unit via conduit 16. Likewise the heated concentrated lithium bromide from the generator unit is fed to the absorber unit via conduit 21.

In one nonlimiting embodiment the absorber unit 4 comprises a falling film type column fitted with multiple plates 12 which provide a large absorption surface and which allow cooling and a reliable and uniform rate of concentration of the lithium bromide solution. Concentrated LiBr from the generator is fed via heat exchanger 5 via pump 9 to the top of the absorber which operates on counter current principles. The density of the lithium bromide solution decreases as the liquid drains down the column from one plate to another so that the maximum liquid specific gravity is attained at the top of the column. The vapor supplied from the evaporator unit is fed to the column near the bottom so that the column operates in counter current mode.

In another nonlimiting embodiment, the absorber unit comprises an injector of the venturi type which ensures rapid intermixing of the recirculating stream of concentrated lithium bromide solution from the generator unit and the water vapor that flows from the evaporator unit. This stream enters the evaporator unit which is fitted with a coiled tube heat exchanger that cools the diluted liquid bromide.

During dynamic movement of a ship, fluid in the device will be inertially affected, will transfer momentum and be in motion. The acceleration and motion of the fluids affects heat transfer in the evaporator unit and condenser unit, forces on surfaces in the process tanks, and increases contamination from one process stage to another thereby affecting the processes in the device. This tendency is controlled by fitting baffles to minimize any undesirable fluid movement and liquid entrainment in vapor phases. Turbulence and momentum transfer can also cause fluids in the voluminous containers of the device to be entrained into the connecting tubes where material velocities are high. This can result, for example, in dilution of the absorbent in the absorber unit by water entrained from the evaporator unit thereby lowering the efficiency of the absorber unit, and entrainment of lithium bromide from the generator unit to the evaporator unit thereby critically affecting the efficiency of the evaporation process.

Thus, as it is an aim of the present invention to make an absorption refrigeration suitable for marine operation, the units of the absorption refrigerator device are fitted with entrainment limiting devices and operated so as to ensure that only limited amounts of concentrated lithium bromide solution are transferred by entrainment to the condenser unit 2 to avoid contamination and fouling of the water domain and reduced thermal efficiency.

On repeated start and restart of the equipment crystallization of entrained lithium bromide can foul and block the internal drain 20, resulting in aborted operation. A closure of operations when the generator unit contains lithium bromide solution at high concentration can result in crystallization fouling if the ambient temperature drops to levels under that which lithium bromide can remain in solution. Accordingly, in one nonlimiting embodiment, these sensitive locations are equipped with a source of heat in order to maintain solubility if the effects of entrainment cannot be adequately resolved.

Alternatively, or in addition, generator pressure can be increase as this serves to free conduits and valves from incipient crystallization and ensures adequate flow through the conduits 19 and 21.

Various nonlimiting operational parameters have been defined for optimal performance. These include the generator unit being operated at a pressure of 63 mbar and a lithium bromide concentration of 60%; the condenser unit being operated at a pressure of 63 mbar and a temperature of 37° C.; the evaporator unit being operated at a pressure of 8 mbar and a temperature of 5° C.; and the absorber unit being operated at a pressure of 8 mbar and a temperature of 37° C.

The refrigeration device of the present invention can be purged of air by evacuating the unit via conduits 17 which are accessible at three points on the circuit and fitted with closure valves. A vacuum buffer tank 18 is provided so that a reserve vacuum is conveniently available.

In one nonlimiting embodiment, the following operational sequence is used to start the device of the present invention. The device is first checked for fouling and crystallization to ensure that all vessels and valves are free from fouling and crystallization. All non-condensable gases are then evacuated from the device. Heat is then applied to the generator unit 1 and internal drain 20. At 60° C., the absorber generator pump 7 is started together with the recirculation pump 9. The evaporator pump 8 is then started and the cooling circuit becomes operational when the fluid level in the absorber unit falls below the vapor delivery conduit valve. The cooling effect will thereafter increase to the desired level.

The invention claimed is:

1. A vapor absorption refrigeration device comprising:
    an absorber unit, wherein water vapor deriving from an evaporator unit is absorbed in a concentrated solution of lithium bromide releasing heat;
    a generator or concentrator unit comprising a generator column, a top and a base, wherein said top is fitted with a demister or mist-eliminator, wherein a diluted solution of lithium bromide is concentrated by energy absorbing evaporation, and wherein the generator or concentrator unit and the top of the generator or concentrator unit is rinsed by periodically regulating a small back-flow of highly diluted lithium bromide solution to the top of the generator column;
    a U-tube fitted between the absorber unit and the base of the generator unit;
    a condenser unit wherein vapor from the generator unit is cooled to a liquid by a coolant supply, said condenser unit comprising a plate heat exchanger cooled from an exterior supply and a pressure regulating u-tube which controls the difference in pressure between the pressure domains in the condenser unit and the evaporator unit, wherein the exterior supply comprises a supply of cooling water, circulated sea-water or low temperature coolant circulation from a ship in which the vapor absorption refrigeration device is placed; and
    an evaporator unit wherein the water deriving from the condenser unit is evaporated thereby extracting heat from the exterior source that is to be refrigerated.

2. The vapor absorption refrigeration device of claim 1 further comprising an absorber-generator transfer pump with a heat exchanger which pumps the diluted lithium bromide solution into the bottom of the generator unit.

3. The vapor absorption refrigeration device of claim 2 further comprising conduits which transfer concentrated lithium bromide solution from the base of the generator unit to the heat-exchanger and return the concentrated lithium bromide solution to the absorber unit so that the lithium bromide concentrate from the generator unit is cooled below its boiling point at the pressure in the absorber unit.

4. The vapor absorption refrigeration device of claim 3 wherein heat recovered from cooling the concentrated lithium bromide is utilized to preheat the dilute lithium bromide being transferred to the generator unit.

5. The vapor absorption refrigeration device of claim 1 further comprising baffles or baffle trays in one or more units.

6. The device of claim 5 wherein the generator unit comprises a central divisor plate and a plurality of stepped baffles or baffle trays on both sides of the central divisor plate.

7. The vapor absorption refrigeration device of claim 1 further comprising baffle trays and an entry tube for vapor in the generator unit, wherein the entry tube is fitted to a lower plate in a disentrainment section of the generator and projected downward.

8. The vapor refrigeration device of claim 1 wherein the evaporator unit comprises a heat exchanger part connected via a conduit to a buffer tank containing condensate water deriving from the condenser unit that allows separation of liquid and vapor phases and minimizes effect of wide variation in ambient operating temperature.

9. The vapor refrigeration device of claim 1 wherein recirculation of any water in the device is forced by a pump thereby hindering local formation of ice in the evaporator unit or buffer tank.

10. The vapor refrigeration device of claim 1 wherein an inclined conduit transfers vapor from the evaporator unit to the absorber unit.

11. The vapor refrigeration device of claim 10 wherein the included conduit is fitted with baffles to limit liquid entrainment by momentum transfer from the absorber unit back to the evaporator unit under turbulent conditions.

12. The vapor refrigeration device of claim 1 wherein the absorber unit comprises a tall column fitted with stepped baffle plates to create a large absorption surface.

13. The vapor refrigeration device of claim 12 wherein the column is a falling film type column fitted with multiple plates.

14. The vapor refrigeration device of claim 1 wherein the absorber unit comprises an injector for intermixing of any recirculating stream of concentrated lithium bromide solution from the generator unit and the water vapor that flows from the evaporator unit.

15. A method for regulating climate on a ship, said method comprising fitting the ship with the vapor absorption refrigeration device of claim 1.

* * * * *